(12) United States Patent
Wilcox et al.

(10) Patent No.: US 8,291,636 B2
(45) Date of Patent: Oct. 23, 2012

(54) FISHING ROD HOLDER

(75) Inventors: Roger S. Wilcox, Fort Lauderdale, FL (US); Scott A. Wilcox, Plantation, FL (US)

(73) Assignee: Tigress Trading Co., Inc., Fort Lauderdale, FL (US)

( * ) Notice: Subject to any disclaimer, the term of this patent is extended or adjusted under 35 U.S.C. 154(b) by 883 days.

(21) Appl. No.: 12/102,279

(22) Filed: Apr. 14, 2008

(65) Prior Publication Data

US 2008/0250692 A1 Oct. 16, 2008

Related U.S. Application Data

(60) Provisional application No. 60/911,599, filed on Apr. 13, 2007.

(51) Int. Cl.
*A01K 97/10* (2006.01)
(52) U.S. Cl. ............... 43/21.2; 114/364; 248/534
(58) Field of Classification Search ............... 43/21.2; 114/255, 364; 248/511, 519, 520, 534, 538
See application file for complete search history.

(56) References Cited

U.S. PATENT DOCUMENTS

| | | | |
|---|---|---|---|
| 3,052,065 A * | 9/1962 | Rettman | 52/27 |
| 3,246,865 A * | 4/1966 | Latimer | 248/515 |
| 4,836,127 A | 6/1989 | Wille | |
| 5,054,229 A * | 10/1991 | Hughes | 43/21.2 |
| 5,054,738 A * | 10/1991 | Harding | 248/538 |
| 5,065,540 A | 11/1991 | Potter, Jr. | |
| 5,163,244 A | 11/1992 | Rupp | |
| 5,301,451 A | 4/1994 | VanAssche | |
| 5,321,904 A * | 6/1994 | Benson | 43/21.2 |
| 5,322,254 A | 6/1994 | Birkmeier | |
| D348,504 S | 7/1994 | Dahmen | |
| 5,813,162 A | 9/1998 | Tse et al. | |
| D407,137 S | 3/1999 | Thompson | |
| 6,088,946 A * | 7/2000 | Simmons | 43/15 |
| 6,269,584 B1 * | 8/2001 | Peaschek | 43/21.2 |
| 6,345,722 B1 | 2/2002 | Wingate | |
| D461,521 S | 8/2002 | Krueger | |
| D464,705 S | 10/2002 | Ratliffe | |
| 6,497,067 B1 | 12/2002 | King | |
| D476,716 S | 7/2003 | Wegman | |
| D480,782 S | 10/2003 | DeBerry et al. | |
| D483,436 S | 12/2003 | Tull | |
| 6,672,525 B2 | 1/2004 | Koike et al. | |
| D499,789 S | 12/2004 | Bridgewater | |
| D516,164 S | 2/2006 | Roth et al. | |
| 6,993,865 B2 | 2/2006 | Peters et al. | |
| 2002/0043014 A1 * | 4/2002 | Kondash | 43/17 |
| 2004/0206288 A1 * | 10/2004 | Wilcox et al. | 114/255 |
| 2006/0064920 A1 | 3/2006 | Wilcox et al. | |

* cited by examiner

*Primary Examiner* — Darren W Ark
*Assistant Examiner* — Kathleen Iwasaki

(57) ABSTRACT

This invention is directed to a fishing rod holder having a generally annular mounting bezel which generally surrounds the mouth of a tube for receiving the butt of a fishing rod. The underside of the mounting bezel includes at least one blind hole or projecting mounting stud for receiving a fastener for securely mounting the fishing rod holder to a panel member of a marine vessel without penetrating the exposed upper surface of the mounting bezel in order to provide an aesthetically pleasing appearance.

5 Claims, 3 Drawing Sheets FISHING ROD HOLDER

CROSS-REFERENCE TO RELATED APPLICATION

This application claims priority under 35 U.S.C. §119(e) to co-pending U.S. Provisional Application Ser. No. 60/911, 599, filed Apr. 13, 2007 and entitled "FISHING ROD HOLDER" for all commonly disclosed subject matter. U.S. Provisional Application Ser. No. 60/911,599 is expressly incorporated herein by reference in its entirety to form a part of the present disclosure.

FIELD OF THE INVENTION

This invention relates to the field of fishing rod holders of the type mountable on marine vessels by way of a mounting bezel which surrounds the mouth of a tube for receiving the butt of a fishing rod. More particularly, the invention relates to a fishing rod holder of such type wherein the mounting bezel is attachable to the vessel by means of fasteners not visible on the upper surface of the bezel after the rod holder has been mounted to the vessel.

BACKGROUND OF THE INVENTION

Fishing rod holders of the type used on marine vessels, such as sport fishing and pleasure boats, generally include a hollow tube in which the butt end of a fishing rod can be inserted to hold a fishing rod in a generally upright, angled or vertical, position for purposes of storage or to hold the rod while fishing. Such fishing rod holders commonly include a mounting bezel surrounding the mouth of the tube. The mounting bezel is typically provided with a plurality of holes for receiving fasteners which can be inserted through the body of the mounting bezel and a panel of the vessel in order to attach the rod holder to the vessel. Machine screws, bolts or wood screws are generally used and are inserted such that the top of the head of the screws remain visible on the exposed upper surface of the mounting bezel after the fishing rod holder has been installed. Because of their visibility on the upper surface of the bezel, the fasteners detract from the appearance of the installation. Irregularities such as driving slots or holes in the heads of the fasteners are also prone to retain dirt and water, a condition which is even more unsightly and promotes corrosion of the fasteners and the mounting bezel itself.

SUMMARY OF THE INVENTION

The invention relates to a fishing rod holder having mounting bezel is attachable to the vessel by means of fasteners not visible on the upper surface of the bezel after the rod holder has been mounted to the vessel. In a preferred embodiment the underside of the mounting bezel includes at least one, and preferably three (3 each), blind holes for receiving a fastener for mounting the fishing rod holder to the vessel in a manner such that the fastener is not visible on the exposed upper surface of the bezel after mounting. In an alternative embodiment, the underside of the mounting bezel includes at least one downward projection, such as a stud, to which a fastener such as a retaining cap or clip can be secured to attach the rod holder to a mounting panel.

DETAILED DESCRIPTION

Figure 1:
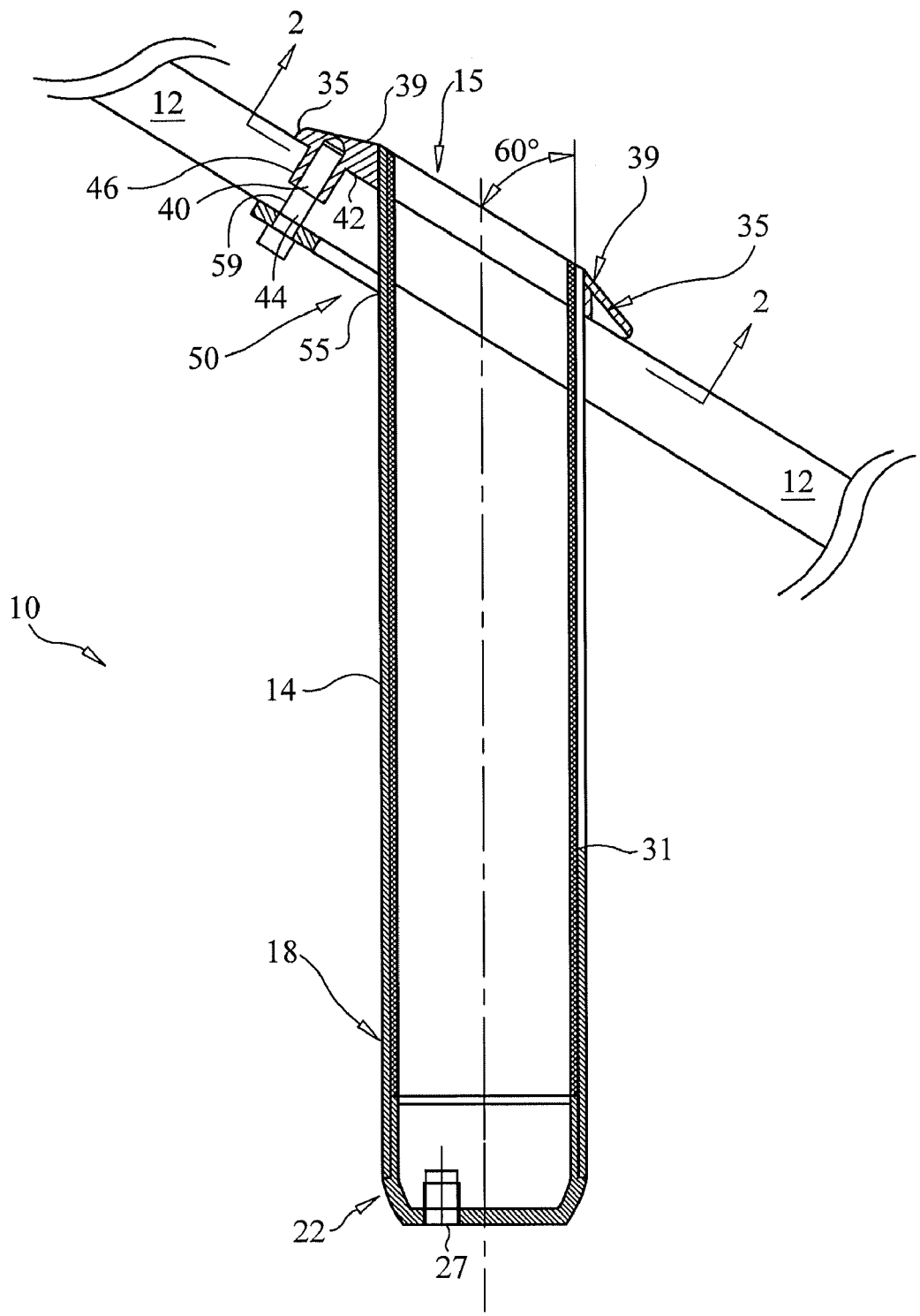
FIG. 1 is a side cross-sectional view taken along line 1-1 of FIG. 2 showing a preferred embodiment of the invention, shown as installed in a panel of a marine vessel.
Figure 2:
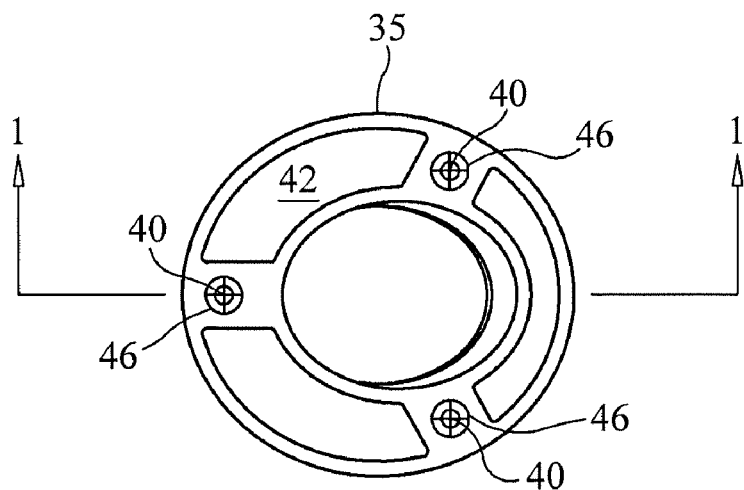
FIG. 2 is a sectional view taken along line 2-2 of FIG. 1 showing a bottom view of the mounting bezel of the embodiment of FIG. 1.

A first preferred embodiment of the invention is shown in longitudinal cross-section in FIG. 11. FIG. 1 shows a fishing rod holder 10 mounted to a structural panel 12, such as gunwhale, of a marine vessel. Fishing rod holder 10 comprises a hollow, cylindrical tube 14 having an open upper end, or mouth 15, and lower end 18 which terminates in an end cap 22 which is connected to tube 14 by way of any suitable connection such as brazing, welding, soldering or a threaded connection. Tube 14 may be formed of plastic or any suitable material but is preferably formed of metal of a type resistant to corrosion or plated or coated to be resistant to corrosion such as stainless steel or chrome plated steel. Optionally, end cap 22 may include a drain opening 27 through which water may freely drain from the interior of rod holder 10. If desired, drain opening 27 may include internal pipe threads for receiving a nipple to which a length of plastic tubing (not shown) may optionally be connected in order to direct drain water to a desired drain location. In order to protect the surface finish of fishing rods as well as to provide an attractive internal appearance, the interior of tube 14 is optionally provided with a tubular liner 31 of plastic or other suitable material sized to fit snugly but removably within the interior of tube 14 as shown in FIG. 1.

Figure 3:
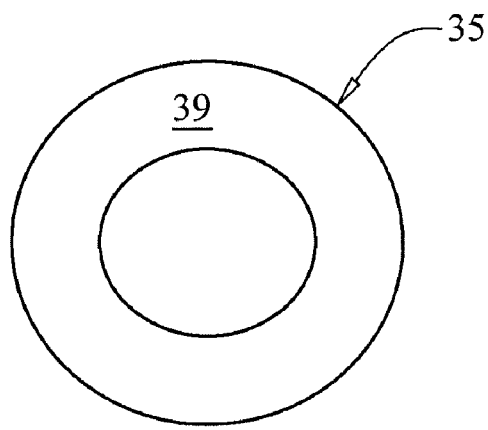
FIG. 3 is a top view of the mounting bezel of the embodiment of FIG. 1.

The open upper end of tube 15 is surrounded by an annular mounting bezel 35 which may suitably for be formed of plastic or any desired material but which is preferably formed of stainless steel or other corrosion resistant material. Bezel 35 includes an upper surface 39 which may be provided with a desired surface finish and which, in accordance with the invention and as illustrated in FIGS. 1 and 3, shows no visible signs of any fasteners when rod holder 10 is installed. The surface finish of the upper surface 39 of the mounting surface is preferably one which exhibits an aesthetically pleasing appearance such as a brightly polished, or brushed metal finish or any suitable clear or colored surface coating such as an anodized finish, a powder-coated finish or the like. To this end, according to one preferred embodiment of the invention, the lower surface 42 of mounting bezel 35 is provided with at least one, and preferably several, blind holes 40 for receiving a fastener 44, such as a cap screw, used for securing fishing rod holder 10 to panel 12. If mounting bezel 35 is sufficiently thick and strong, blind holes 40 may simply be formed entirely within the main portion of the body of mounting bezel 35. Otherwise, if additional strength or thread contact area is needed, mounting bezel 35 can be provided with one or more hollow or partially hollow projections or bosses 46 through which pass at least a portion of the depth of blind holes 40 as shown in FIG. 1. Blind holes 40 may suitably be provided with internal threads in order to receive a correspondingly threaded fastener 44. Alternatively, fastener 44 may be of a self-tapping or self-threading type so that blind holes 40 need not be internally pre-threaded.

In the embodiment shown in FIG. 1, tube 14 happens to project from the underside 42 of mounting bezel at an angle of sixty degrees (60°) but the angle is not critical to the invention. Other angles, including ninety degree (90°), forty five degree (45°), thirty degree (30°), or other angles are of course possible within the scope of the present invention.

Figure 4:
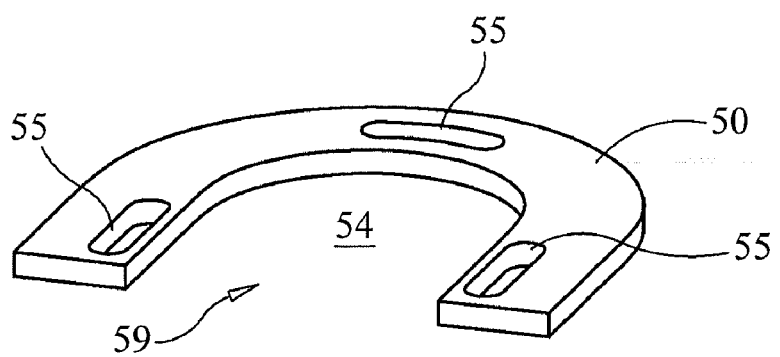
FIG. 4 is a perspective view top view of optional support bracket shown in FIG. 1.

To provide enhanced structural integrity rod holder 10 is preferably mounted with the aid of an optional backing plate 50 which may suitably be formed of a flat stock material having a central opening 54 through which tube 14 may freely pass. Backing plate 50 is particularly useful in cases where the panel 12 in which rod holder 10 is to be mounted is thin or lacks structural integrity. Backing plate 50 is provided with a series of openings 55 through which the bodies, but not the heads, of fasteners 44 may pass. Preferably, openings 55 are elongated and backing plate 50 has an open-ended shape, such as the open-ended "U" shape shown in FIG. 4. The elongation of fastener openings 55 and the open end 59 of opening 54 within backing plate 50 allow an angled rod holder 10 to be installed in panels 12 having a range of thicknesses and allow a single configuration of backing plate 50 to accommodate a variety of rod holders whose tubes 14 depend at differing angles from their mounting bezels 35.

In operation, rod holder 10 is installed by drilling, or otherwise forming a hole through a gunwhale, or other panel 12 of a marine vessel, of sufficient diameter to accommodate tube 14. Smaller holes for accommodating fasteners 44 are then drilled, or otherwise formed, in locations corresponding to the locations of blind holes 40 of mounting bezel 35. The lower end 18 of rod holder 10 is then passed through hole 55 and rod holder 10 is lowered until 42 the underside of mounting bezel 35 rests flush on the upper surface of panel 12. Fasteners 44 are then passed upwardly through backing plate 12, and panel 12 and are fastened inside blind holes 40 to securely fasten rod holder 10 to vessel panel 12. The fasteners 44 are not visible on the upper surface 39 of mounting bezel 35 and thus neither detract from the finished appearance of the upper surface 39 of mounting bezel 35 nor accumulate contaminants or moisture capable of fostering deterioration or corrosion of surface 39.

In use after installation, the butt end of a fishing rod may be inserted into the tube 14 of fishing rod holder 10 to support the rod for storage or while the rod is in use with the vessel either stationary or in motion, as when drifting or trolling a lure or other bait.

Figure 5:
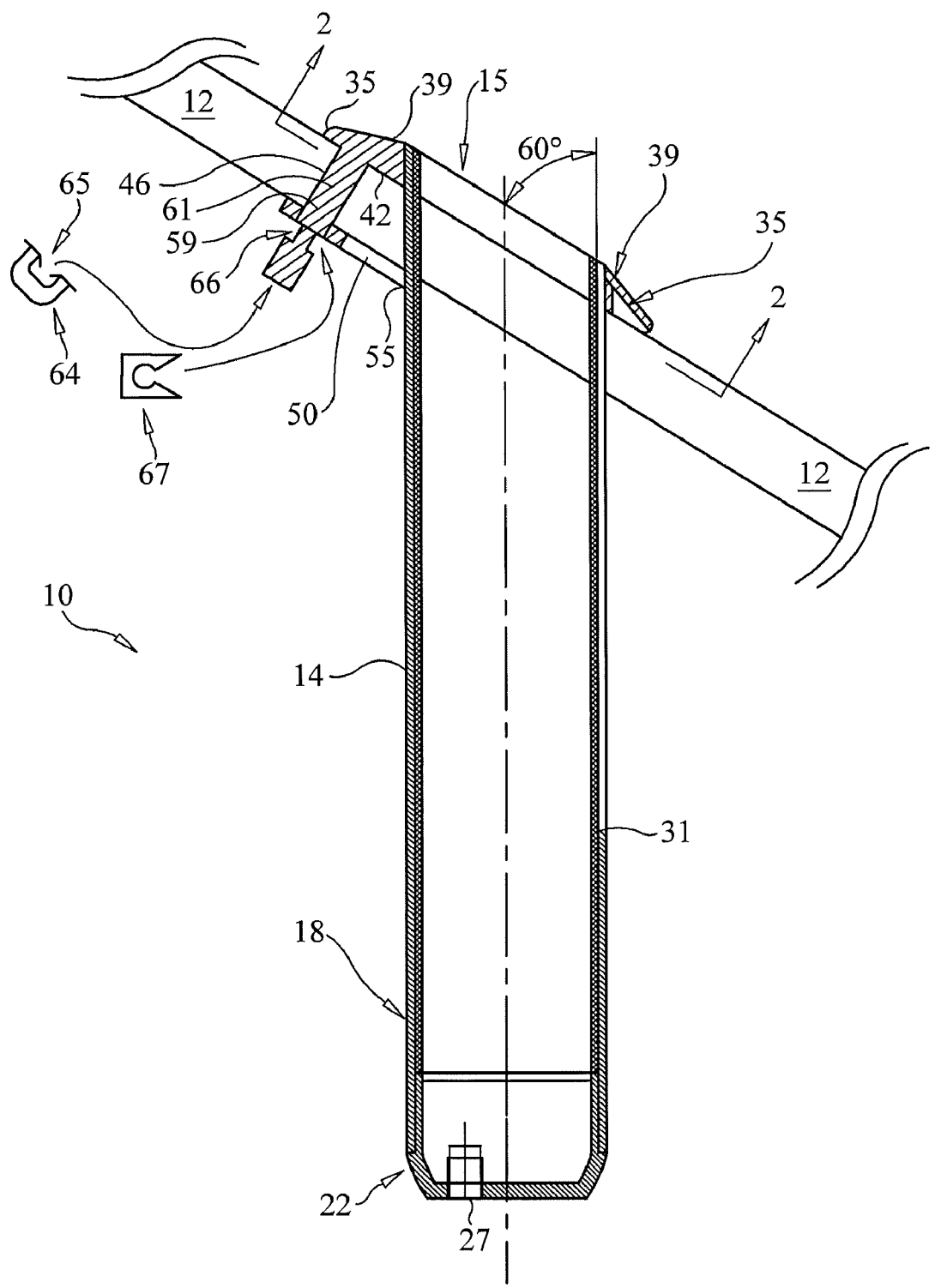
FIG. 5 is a side cross-sectional view of an alternative embodiment of the invention, shown as installed.

In an alternative embodiment illustrated in FIG. 5, the underside of the mounting bezel includes at least one, and preferably three (3 each) generally outwardly and downwardly projecting mounting studs 61 which can either be threaded externally to receive a nut or unthreaded to receive a push-on, self-locking "Tinnerman" type fastener or retaining cap 64 such as the type formed with internal locking barbs 65. Alternatively, studs 61 can be provided with an external groove 66, or series of grooves which may receive a clip type retainer 67 such as a snap ring in order to secure fishing rod holder 10 to vessel panel 12. Such mounting stud(s) 61 can be provided in lieu of, or in addition to, at least one blind hole 40 which can be used for attachment purposes in the manner described above.

While the invention has been described with reference to preferred embodiments, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims and all legal equivalents.

What is claimed is:

1. A fishing rod holder mountable in an opening in a panel of a marine vessel, said fishing rod holder, comprising:
   a hollow tube having a mouth for receiving a butt of the fishing rod, said hollow tube having an inner wall;
   a tubular liner received in said hollow tube inside said inner wall;
   a mounting bezel directly connected to said hollow tube and at least partially surrounding said mouth, said mounting bezel having a lower surface which faces an upper surface of the panel when the rod holder is mounted in the opening in the panel, said mounting bezel having an exposed upper surface which lies above an upper surface of the panel when the rod holder is mounted, said mounting bezel having at least one blind hole formed therein which does not penetrate said upper surface of said mounting bezel; and
   a substantially planar backing plate having at least one opening positioned for receiving a fastener through said opening in said backing plate and into said blind hole such that the panel is captured between said backing plate and said lower surface of said bezel to mount the rod holder to the panel upon securing said fastener into said blind hole, said backing plate having a second opening through which said hollow tube and said liner are received, said hollow tube and said liner extending through the panel when the rod holder is mounted in the opening in the panel.

2. A fishing rod holder as claimed in claim 1, wherein at least one stud projects from said lower surface of said mounting bezel and at least a portion of said blind hole is formed in said stud.

3. A fishing rod holder as claimed in claim 1, wherein said blind hole is threaded.

4. A fishing rod holder as claimed in claim 1, wherein said blind hole is unthreaded.

5. A fishing rod holder as claimed in claim 1, wherein said backing plate is substantially U-shaped.

* * * * *